US012689128B2

(12) United States Patent
Clark et al.

(10) Patent No.: US 12,689,128 B2
(45) Date of Patent: Jul. 21, 2026

(54) MODULAR NARROW-BAND DIPOLE ANTENNAS

(71) Applicant: Leolabs, Inc., Menlo Park, CA (US)

(72) Inventors: Brian Clark, Menlo Park, CA (US); Aaron Carroll, Sunnyvale, CA (US); Craig Trumbull, San Francisco, CA (US); John Buonocore, Redwood City, CA (US); Gerald Wong, Cupertino, CA (US)

(73) Assignee: LeoLabs, Inc., Menlo Park, CA (US)

(*) Notice: Subject to any disclaimer, the term of this patent is extended or adjusted under 35 U.S.C. 154(b) by 77 days.

(21) Appl. No.: 18/813,573

(22) Filed: Aug. 23, 2024

(65) Prior Publication Data

US 2025/0070472 A1 Feb. 27, 2025

Related U.S. Application Data

(60) Provisional application No. 63/534,442, filed on Aug. 24, 2023.

(51) Int. Cl.

| | |
|---|---|
| ***H01Q 9/46*** | (2006.01) |
| ***H01Q 1/50*** | (2006.01) |
| ***H01Q 9/14*** | (2006.01) |

(52) U.S. Cl.

CPC ................. *H01Q 9/46* (2013.01); *H01Q 1/50* (2013.01); *H01Q 9/14* (2013.01)

(58) Field of Classification Search

None

See application file for complete search history.

(56) References Cited

U.S. PATENT DOCUMENTS

| | | | | |
|---|---|---|---|---|
| 8,786,511 | B1 * | 7/2014 | Dao | H01Q 21/26 343/793 |
| 11,848,492 | B2 * | 12/2023 | Semonov | H01Q 15/14 |
| 2012/0081259 | A1 * | 4/2012 | Regala | H01Q 21/26 343/797 |

* cited by examiner

*Primary Examiner* — Dameon E Levi
*Assistant Examiner* — Anh Ho
(74) *Attorney, Agent, or Firm* — Dentons US LLP

(57) ABSTRACT

A narrow-band dipole antenna module comprising: a housing comprising a base having an opening defined therein, and a hollow post extending from the opening and having a plurality of antenna openings defined therein; a circuit assembly configured for insertion into the housing comprising: an input printed circuit board having transmit and receive connectors thereon; a matching printed circuit board having lumped element matching components and a plurality of terminal blocks thereon; a pair of coaxial feed lines connected between the input and matching printed circuit boards, each having a coil formed therein such that the feed lines act as a balun; and at least one rigid support member connected between the input and matching printed circuit boards such that when the circuit assembly is inserted into the housing the terminal blocks are adjacent the antenna openings; and a plurality of antenna elements configured to be connected to the terminal blocks.

20 Claims, 4 Drawing Sheets

MODULAR NARROW-BAND DIPOLE ANTENNAS

STATEMENT REGARDING FEDERALLY SPONSORED RESEARCH OR DEVELOPMENT

This invention was made with Government support under Contract No. FA864923P1049 awarded by the U.S. Department of the Air Force. The Government has certain rights in the invention.

TECHNICAL FIELD

The present disclosure relates to narrow-band dipole antennas.

BACKGROUND

The drooping cross-dipole is a well-understood antenna architecture. However, implementation of this approach can be costly, complicated, difficult to tune, susceptible to overheating at high power and subject to environmental concerns.

The inventors have determined a need for improved antenna designs that address these cost, power, tuning, and environmental realities through several novel means without sacrificing performance.

SUMMARY

One aspect of the present disclosure provides a narrow-band dipole antenna module comprising: a housing comprising a base having an opening defined therein, and a hollow post extending from the opening in the base, the hollow post having a plurality of antenna openings defined therein near a distal end thereof; a circuit assembly configured for insertion into the housing, the circuit assembly comprising: an input printed circuit board having a transmit connector and a receive connector thereon for connecting to an antenna-driving circuit; a matching printed circuit board having lumped element matching components and a plurality of terminal blocks thereon, each terminal block configured to receive an antenna element; a pair of coaxial feed lines connected between the input printed circuit board and the matching printed circuit board, each of the pair of coaxial feed lines having a coil formed therein such that the pair of coaxial feed lines acts as a balun; and at least one rigid support member connected between the input printed circuit board and the matching printed circuit board to hold the matching printed circuit board at a fixed distance from the input printed circuit board such that when the input printed circuit board is mounted to an underside of the base plate the terminal blocks on the matching printed circuit board are adjacent the antenna openings in the hollow post; and a plurality of antenna elements configured to be received through the antenna openings and connected to the terminal blocks. In some implementations, one of the pair of coaxial feed lines has a clockwise coil formed therein and the other of the pair of coaxial feed lines has a counterclockwise coil formed therein. In some implementations, the matching printed circuit board has a first face facing the input printed circuit and a second face opposite the first face with the terminal blocks mounted on the second face, and comprises a pair of feed line landing pads for connecting to the pair of coaxial feed lines, each feed line landing pad comprising an annular ring on the first face of the matching printed circuit board for connecting to an outer conductor of the feed line, and plated through hole extending from within to annular ring on the first face to the second face of the matching printed circuit board for connecting to an inner conductor of the feed line. In some implementations, the narrow-band dipole antenna module further comprises an isolator element for each of the plurality of antenna openings, the isolator element having a protrusion extending from a first side thereof configured to engage one of the antenna openings, and a recess on a second side thereof for receiving one of the antenna elements, the recess having an aperture therein extending to the first side of the isolator element to permit the antenna element to directly engage the terminal block. In some implementations, the narrow-band dipole antenna module further comprises a first sealing ring between the first side of each isolator element and the housing for forming a seal between the isolator element and the housing, and a second sealing ring between the second side of each isolator element and the antenna element for forming a seal between the isolator element and the antenna element. In some implementations, the terminal blocks are configured to hold the antenna elements at an angle of 45 degrees from a longitudinal axis of the hollow post. In some implementations, the plurality of antenna openings comprises four antenna openings, the plurality of terminal blocks comprises four terminal blocks, and the plurality of antenna elements comprises four antenna elements.

Another aspect of the present disclosure provides a method for assembling a narrow-band dipole antenna, the method comprising: assembling a circuit assembly comprising an input printed circuit board having a transmit connector and a receive connector thereon for connecting to an antenna-driving circuit, a matching printed circuit board having lumped element matching components and a plurality of terminal blocks thereon, each terminal block configured to receive an antenna element, a pair of coaxial feed lines connected between the input printed circuit board and the matching printed circuit board, each of the pair of coaxial feed lines having coil formed therein such that pair of coaxial feed lines acts as a balun, and at least one rigid support member connected between the input printed circuit board and the matching printed circuit board to hold the matching printed circuit board at a fixed distance from the input printed circuit board; inserting the circuit assembly into a housing comprising a base having an opening defined therein and a hollow post extending from the opening in the base, the hollow post having a plurality of antenna openings defined therein near a distal end thereof such that when the input printed circuit board is mounted to an underside of the base plate the terminal blocks on matching printed circuit board are adjacent the antenna openings in the hollow post; and connecting a plurality of antenna elements to the plurality of terminal blocks.

Further aspects of the present disclosure and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

Figure 1:
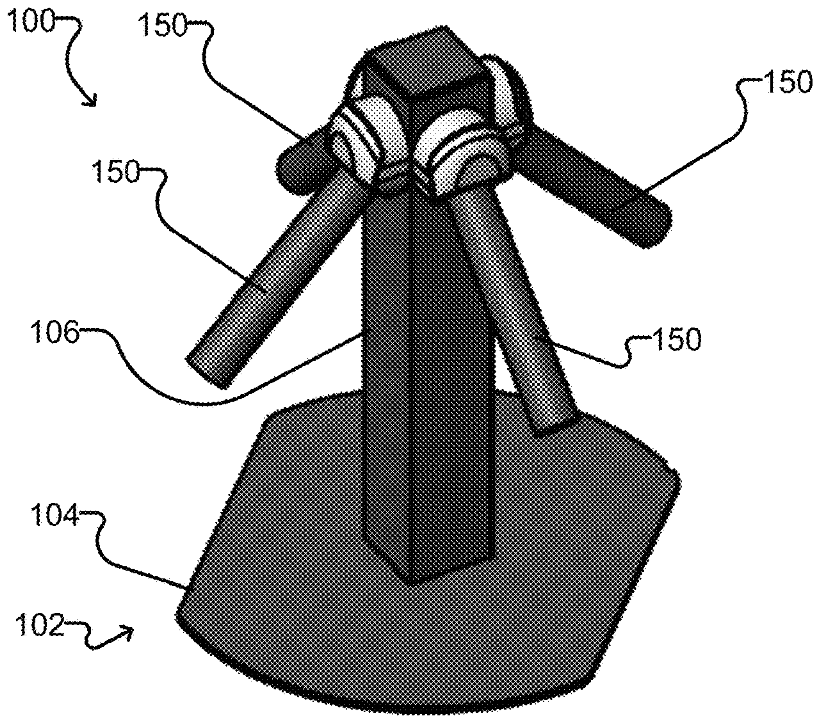
FIG. 1 illustrates an example narrow-band cross-dipole antenna module according to one embodiment of the present disclosure.

Generally, this disclosure discloses narrow-band dipole antennas having mechanically robust modular construction, are easy to assemble, and lower in cost than typical existing antenna designs. The example embodiments shown in the Figures are configured as cross-narrow-band dipole antennas with four drooped antenna elements, but other embodiments could have different numbers and configurations of antenna elements. Some embodiments of the present disclosure provide antenna modules particularly suited for use with 1D or 2D phased array radar systems operating in the UHF Band, but antenna modules according to the present disclosure could also be used with other types of radar systems and frequency bands.

This disclosure is now described more fully with reference to the Figures, in which various example embodiments of this disclosure are shown. This disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described.

Various terminology used herein can imply direct or indirect, full or partial, temporary or permanent, action or inaction. For example, when an element is referred to as being “on,” “connected” or “coupled” to another element, then the element can be directly on, connected or coupled to the other element or intervening elements can be present, including indirect or direct variants. In contrast, when an element is referred to as being “directly connected” or “directly coupled” to another element, then there are no intervening elements present.

Various terminology used herein is for describing particular example embodiments and is not intended to be necessarily limiting of this disclosure. As used herein, various singular forms “a,” “an” and “the” are intended to include various plural forms as well, unless specific context clearly indicates otherwise. Various terms “comprises,” “includes” or “comprising,” “including” when used in this specification, specify a presence of stated features, integers, steps, operations, elements, or components, but do not preclude the presence or addition of one or more other features, integers, steps, operations, elements, components, or groups thereof.

As used herein, a term “or” is intended to mean an inclusive “or” rather than an exclusive “or.” That is, unless specified otherwise, or clear from context, “X employs A or B” is intended to mean any of a set of natural inclusive permutations. That is, if X employs A; X employs B; or X employs both A and B, then “X employs A or B” is satisfied under any of the foregoing instances.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as “below,” “lower,” “above,” and “upper” can be used herein to describe one element’s relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a “lower” side of other elements would then be oriented on “upper” sides of other elements. Similarly, if a device in one of illustrative figures were turned over, then various elements described as “below” or “beneath” other elements would then be oriented “above” other elements. Therefore, various example terms “below” and “lower” can encompass both an orientation of above and below.

As used herein, a term “about” or “substantially” refers to a +/−10% variation from a nominal value/term. Such variation is always included in any given value/term provided herein, whether or not such variation is specifically referred thereto.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three-dimensional (3D) printing, laser cutting, computer numerical control routing, milling, pressing, stamping, vacuum forming, hydroforming, injection molding, lithography, and so forth.

Figure 1A:
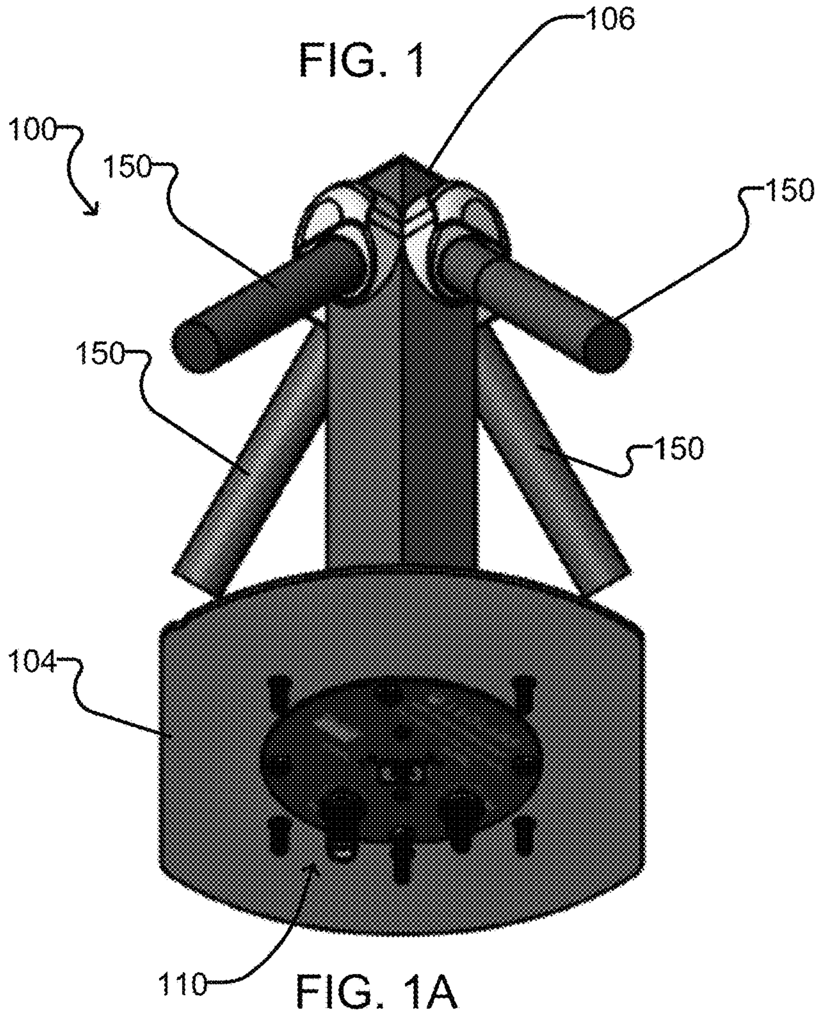
FIG. 1A illustrates the example narrow-band cross-dipole antenna module of FIG. 1 from another angle.

FIGS. 1 and 1A show an example antenna module 100 according to one embodiment of the present disclosure. The antenna module 100 follows the classic cross-dipole architecture to generate circular polarization with drooped elements to reduce scan loss, and is designed for use in a phased-array system. The antenna module comprises a housing 102 having a base 104 for mounting on a supporting structure, such as for example the supporting structure of a transceiver module, and a hollow post 106 extending from the base 104, with four antenna elements 150 extending down at a 45-degree angle from openings 108 at the distal end of the hollow post 106. A circuit assembly 110 is received within the hollow post 106 and provides connection between the antenna elements 150 and an antenna driving circuit, such as, for example, a 50-ohm radar phased array radar system.

The cross-dipole architecture of FIGS. 1 and 1A can alternatively use non-orthogonal or single-dipole architectures. However, the cross-dipole architecture may be used with a quadrature feed to generate circularly polarized radiation from the antenna. Therefore, unless otherwise specified, reference to dipole antenna architecture includes both cross-dipole and single-dipole architectures.

Figure 2:
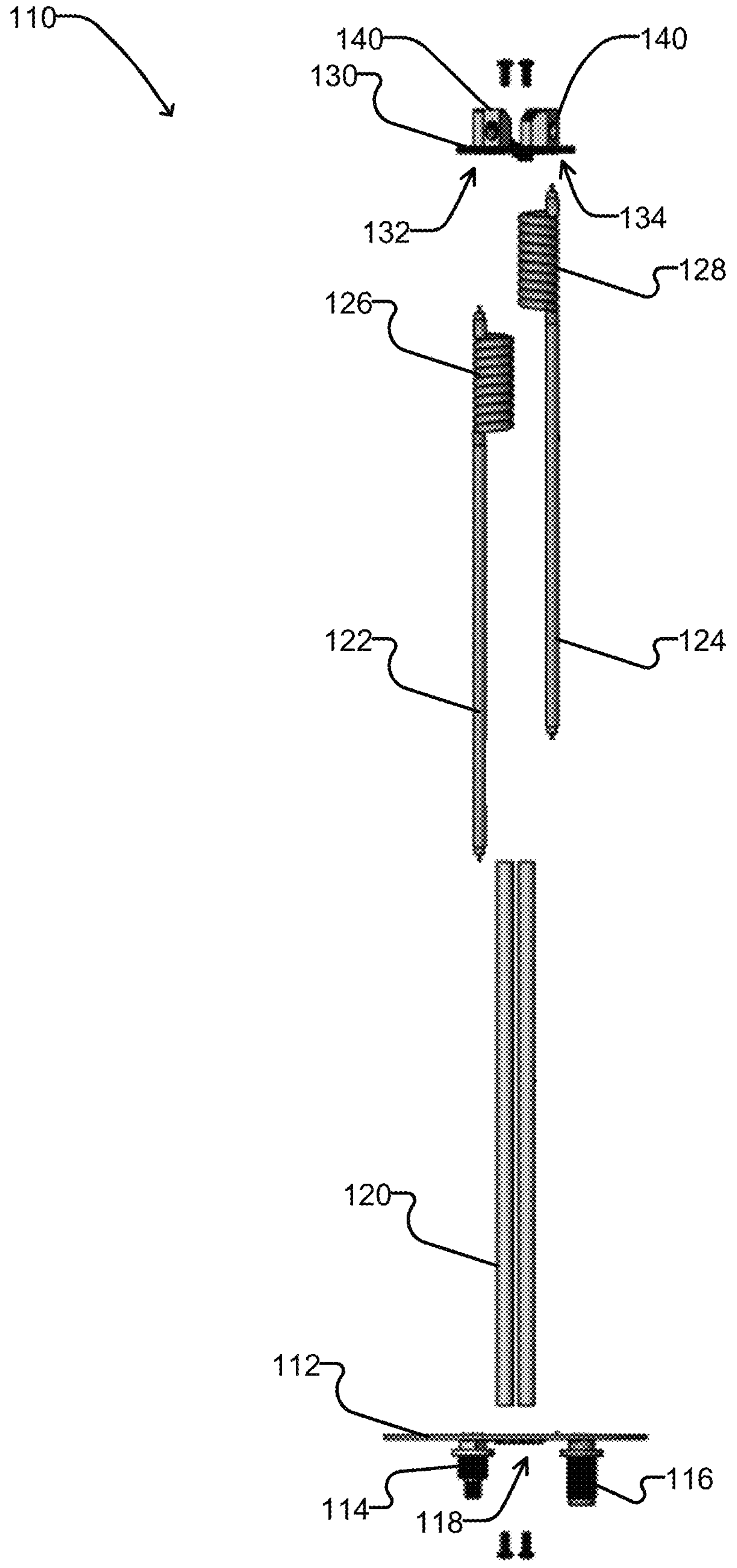
FIG. 2 illustrates a partially exploded view of the circuit assembly of the narrow-band dipole antenna module of FIG. 1.
Figure 3:
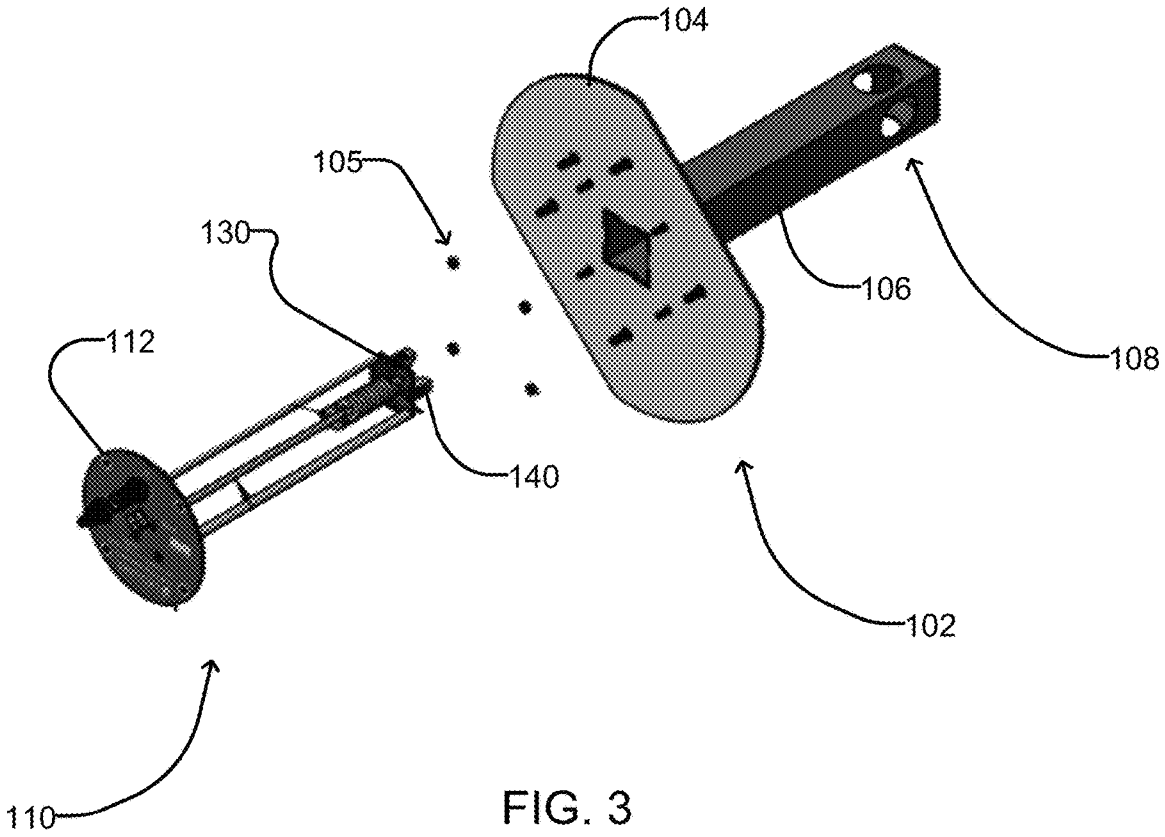
FIG. 3 illustrates the housing and circuit assembly of the narrow-band dipole antenna module of FIG. 1 with the circuit assembly positioned for insertion into the housing.

As seen in FIGS. 2 and 3, the circuit assembly 110 comprises an input printed circuit board 112 and a matching printed circuit board 130 held at a fixed distance from the input printed circuit board 112 by rigid support members 120, and electrically connected by a pair of coaxial feed lines 122 and 124. In the illustrated example, the circuit assembly 110 is configured for insertion into the hollow post 106 which can have a square cross-section, such that the matching printed circuit board 130 is generally square, and the rigid support members 120 comprise a pair of rods connected to opposite corners of the matching printed circuit board 130, but other embodiments may have different configurations of the matching printed circuit board 130 and rigid support member(s) 120.

The input printed circuit board 112 comprises a transmit connector 114, receive connector 116, a hybrid coupler 118, and feed traces with 1M ohm resistors to dissipate static. The coaxial feed lines 122 and 124 each have a first end connected to the input printed circuit board 112 and a second end connected to the matching printed circuit board 130. The coaxial feed lines 122 and 124 comprise coiled portions 126 and 128 formed therein near the second end such that the coaxial feed lines 122 and 124 act as an inductive balun, which can prevent current imbalances between the dipole branches and ensure a symmetrical radiated antenna pattern. The hybrid coupler 118 may enable feeding both dipoles in quadrature. In some implementations the coaxial feed lines 122 and 124 are each coiled 10 times to form coiled portions 126 and 128. In some embodiments, one of coiled portions 126 and 128 is formed with clockwise coils, and the other of coiled portions 126 and 128 is formed with counterclockwise coils to prevent coupling.

The second ends of the coaxial feed lines 122 and 124 are connected to landing pads 132 and 134 on the matching printed circuit board 130. In some implementations, as illustrated by the example embodiment shown in FIGS. 5, 5A, 5B and 5C, the landing pads 132 and 134 each comprise an annular ring 132A/134A on the underside of the matching printed circuit board 130 for connecting to an outer conductor of the feed line 122/124, and plated through hole 132B/134B extending to the upper side of the matching printed circuit board 130 for connecting to an inner conductor of the feed line 122/124. Drooping of the antenna elements 150 and careful selection of the height of antenna elements 150 above ground plane, which is facilitated by the modular design of antenna assemblies according to the present disclosure, tends to lower the feedpoint impedance.

Embodiments can be configured to adjust the size or shape of various elements, including antenna elements 150, hollow posts 106, and other components to allow for different sizes and shapes to tune the modular narrow-band dipole antenna of a particular application or frequency needed. Adjustment may be achieved by having swappable components of different sizes. Embodiments may also allow the sizes or lengths of various elements to be adjustable by, for example, sliding or other means to adjust length or height. These differently sized components may come in a set to be conveniently swapped out in the field should a use case change or to experiment with different antenna configurations of heigh, width, and length, allowing for tuning of the system in real time.

Antenna modules according to some embodiments of the present disclosure are configured such that the feedpoint impedance is close to 50 ohms, and the remaining matching can be accomplished on the matching printed circuit board 130 using just a single capacitor and individual inductor per dipole element. Since the differential feedpoint impedance of each dipole is nominally at 50-ohms, this allows a circuit assembly according to the present disclosure to feed each dipole using a 50-ohm transmission line. Converting the single-ended 50-ohm input to a balanced antenna-driving circuit can be accomplished using a balun. Since everything in this example embodiment is at 50 ohms, a 50-ohm coaxial cable can be used for the feed lines 122/124 forming the balun. The balun distributes and isolates currents flowing into and out of the dipole elements. Current flowing up the coaxial shield excites one element while the current on the centre conductor excites the other half of the dipole. The balun ensures the currents on the inner and outer conductors of the coaxial feed line are balanced so that the dipole radiates with the desired pattern. The isolation function is accomplished by establishing an impedance on the outside of the coax shield. Coiling the coaxial feeds lines near the dipole feedpoints instantiates inductance to impede the flow of current along the outside of the coax shield. In some embodiments, the resulting inductive reactance is at least 10× the characteristic impedance of the feed, or about 500 ohms in the example 50-ohm system. Providing a pair of coiled coaxial cables on the horizontal (H) and vertical (V) feeds can deliver improved cost and power handling in comparison to more complicated balun architectures such as bazooka or parallel line baluns. The coiled cables act as a high-impedance choke for shield currents while being inexpensive to manufacture and able to handle up to 1000 watts due to its inherent low loss. In many applications, coiled feed cable balun architectures according to the present disclosure are preferable to simply placing ferrite chokes over straight feed cables because significant overheating up to the Curie point was observed with ferrites at 1000 W. In some embodiments, efficiency is optimized by a PTFE-coax balun construction and the use of only one matching component per element.

The matching printed circuit board 130 can comprise lumped element-matching components connected between the terminal blocks 140 to match the impedance of the antenna elements 150 to the impedance of the antenna driving circuit. For example, in an example embodiment with a 50-ohm antenna driving circuit, the lumped element-matching components can adjust the impedance of the feedpoint of the antenna elements 150 to be as close as possible to 50 ohms. In embodiments configured for use with a 50-ohm system, a matching network can reduce reflected power and improve efficiency. Foregoing a matching network is difficult at high power due to potentially large inefficiencies and quarter-wave transformers are quite large at UHF. In antennas according to the present disclosure, a PCB-based differential matching network of low-ESR, high-power lumped components on the matching printed circuit board 130 directly feeds the antenna elements 150 through the terminal blocks 140. This allows both dipoles to be fed simultaneously with their own matching networks and permits modular tuning directly at the element feed point. This same PCB-based design can be employed at any frequency by re-selecting the lumped element components.

Figure 4:
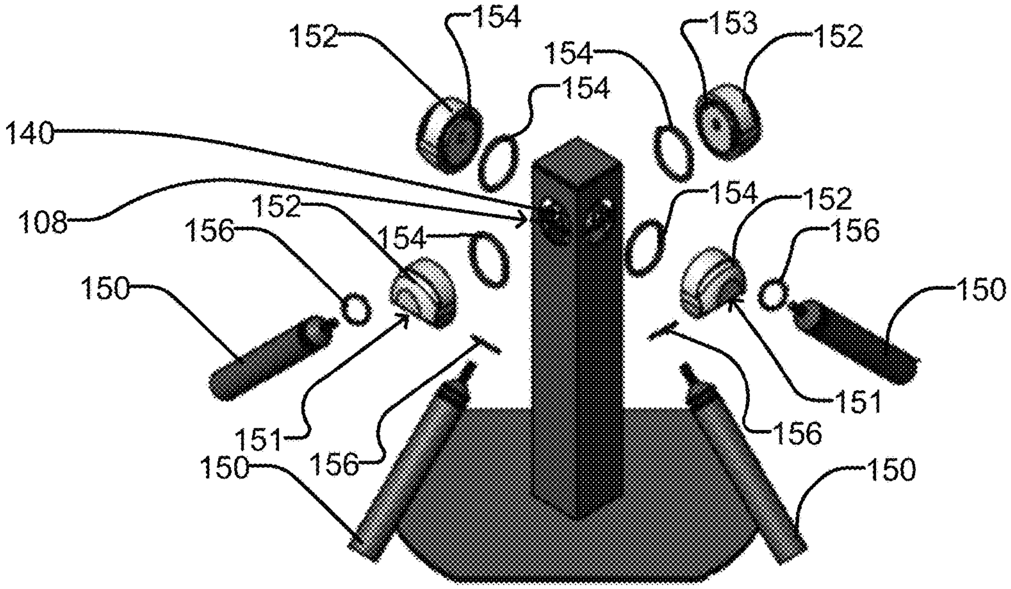
FIG. 4 illustrates a partially exploded view of the narrow-band dipole antenna module of FIG. 1.
Figure 5:
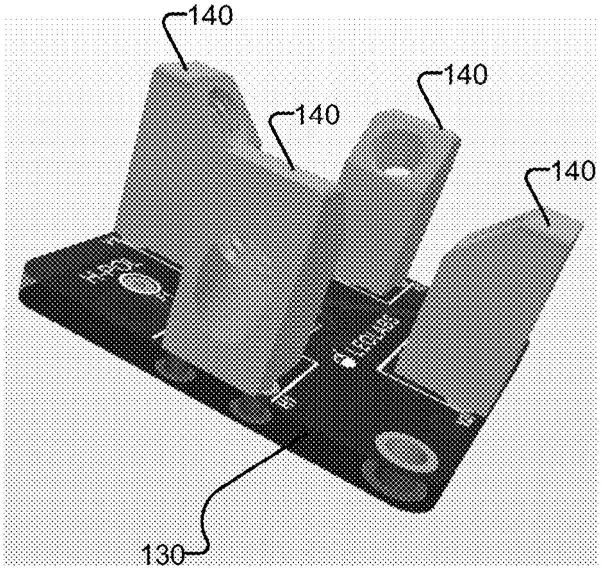
FIG. 5 illustrates an example matching circuit board for the narrow-band dipole antenna module of FIG. 1.
Figure 5A:
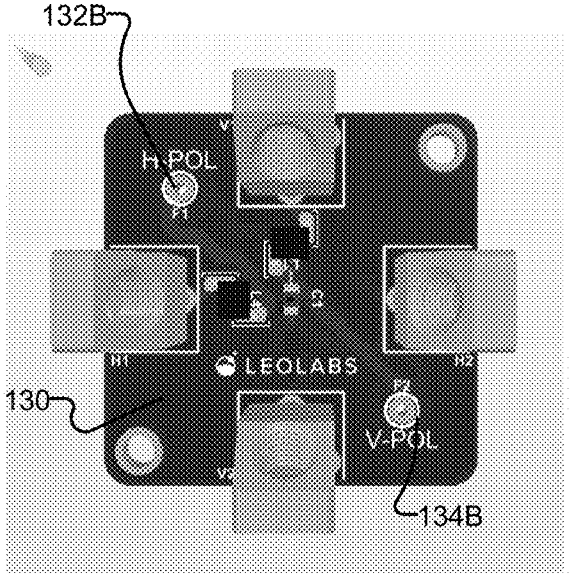
FIG. 5A illustrates a top view of the example matching circuit board of FIG. 5.
Figure 5B:
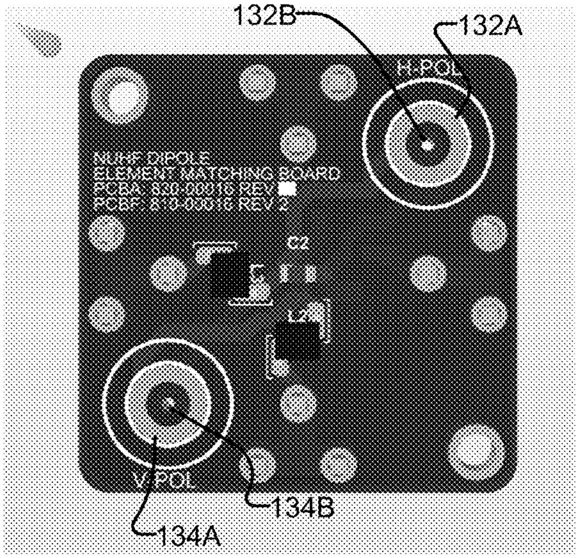
FIG. 5B illustrates a bottom view of the example matching circuit board of FIG. 5.
Figure 5C:
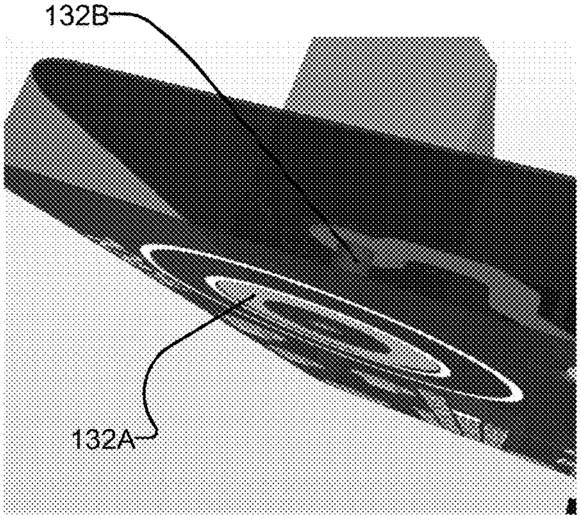
FIG. 5C illustrates an enlarged view of a portion of the example matching circuit board of FIG. 5.

Further details of construction and steps in an example method of assembly are illustrated in FIGS. 3 and 4. Once the circuit assembly 110 has been assembled, it is inserted into the housing 102. In the illustrated example, the housing 102 comprises a hollow post 106 formed from square tube stock with a welded base 104. As shown in FIG. 3, spacer elements 105 may be placed on studs extending from the base 104, with the input printed circuit board 112 mounted on the studs extending from the base 104. Once the circuit assembly 110 has been secured to the housing 102, the terminal blocks 140 will be exposed through the openings 108 in the hollow post 106. As shown in FIG. 4, in some embodiments, before the antenna elements 150 are screwed into the exposed terminal blocks 140, an isolator element 152 (which may, for example be constructed form Delrin/polyoxymethylene or other suitable material) is placed within each opening 108. In some embodiments, each isolator 152 has a protrusion 153 extending from a first side thereof configured to engage one of the antenna openings, and a recess 151 on a second side thereof for receiving one of the antenna elements 150, with an aperture at the base of the recess 151 extending to the first side of the isolator element to permit a threaded connector extending from the antenna element 150 to directly engage the terminal block 140. In some embodiments, a first sealing ring 154 between the first side of each isolator element 152 and the housing, and a second sealing ring 156 between the second side of each isolator element 152 and the antenna element 150, such that the isolators and O-rings create an environmental seal protecting the circuit assembly 110. The finished antenna module 100 can then be mounted to a transceiver module with a similarly sealed interface to be protected from environmental hazards.

Antenna modules constructed according to certain embodiments of the present disclosure provide improvements in addressing environmental concerns, tuning, and manufacturability. In an example embodiment, the electronic components including the hybrid input PCB, coiled balun feed lines, and differential matching PCB can be pre-assembled in an electronics sub-module. This sub-module is then inserted to a welded and anodized antenna post. Finally, the antenna elements are screwed into terminal blocks on the matching PCB with custom insulators and lubricated O-rings ensuring a tight environmental seal. The base of the antenna bolts into a transceiver module with a similarly environmentally sealed interface. The resulting antenna is mechanically robust and easy to assemble. Additionally, in antenna modules constructed according to the present disclosure, tuning the antenna element lengths is very simple because it only involves unscrewing existing antenna elements 150 and swapping in new ones, or swapping one or more other components, such as housing 102 or portions thereof. For example, housing 102 can be comprised of separate components, such as hollow posts 106, openings 108, and bases 104 having different sizes, shapes, or materials. The swappable nature of certain embodiments allows for generation of efficient narrow-band antennas and tuning on-site, resulting in better, more efficient antenna performance and cost savings. Embodiments may also allow for hollow post 106 to adjust its height to change the shape of the beam, by using brackets for example (not illustrated). This embodiments may be optimized for efficiency in a frequency range, a center frequency, input impedance, beam shape, and interactions between 1D and 2D phased array antennas. Embodiments may also use hybrid inputs for quadrature signals.

It will be appreciated that numerous specific details are set forth to provide a thorough understanding of the exemplary embodiments described herein. However, it will be understood by those of ordinary skill in the art that the embodiments described herein may be practiced without these specific details. For example, different low-cost balun designs can be made by using high-power coupling inductors on the PCB to form a choke. Other embodiments may also use two-wire cables other than coaxial, such as twisted pair, etc. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As will be apparent to those skilled in the art in light of the foregoing disclosure, many alterations and modifications are possible to the example embodiments described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A narrow-band dipole antenna module comprising:

a housing comprising a base plate having an opening defined therein, and a hollow post extending from the opening in the base plate, the hollow post having a plurality of antenna openings defined therein near a distal end thereof;

a circuit assembly configured for insertion into the housing, the circuit assembly comprising: an input printed circuit board having a transmit connector and a receive connector thereon for connecting to an antenna-driving circuit;

a matching printed circuit board having lumped element matching components and a plurality of terminal blocks thereon;

a plurality of antenna elements configured to be received through the antenna openings and connected to the terminal blocks;

wherein each of the terminal blocks is configured to receive an antenna element of the plurality of antenna elements;

a pair of coaxial feed lines connected between the input printed circuit board and the matching printed circuit board, each of the pair of coaxial feed lines having a coil formed therein such that the pair of coaxial feed lines acts as a balun; and at least one rigid support member connected between the input printed circuit board and the matching printed circuit board to hold the matching printed circuit board at a fixed distance from the input printed circuit board such that when the input printed circuit board is mounted to an underside of the base plate, the terminal blocks on the matching printed circuit board are adjacent the antenna openings in the hollow post and connecting the plurality of antenna elements to the plurality of terminal blocks.

2. The narrow-band dipole antenna module of claim 1 wherein one of the pair of coaxial feed lines has a clockwise coil formed therein and the other of the pair of coaxial feed lines has a counterclockwise coil formed therein.

3. The narrow-band dipole antenna module of claim 1, wherein the matching printed circuit board has a first face facing the input printed circuit board and a second face opposite the first face with the terminal blocks mounted on the second face, and comprises a pair of feed line landing pads for connecting to the pair of coaxial feed lines, each feed line landing pad comprising an annular ring on the first face of the matching printed circuit board for connecting to an outer conductor of one of the coaxial feed lines, and a plated through hole extending from within to the annular ring on the first face to the second face of the matching printed circuit board for connecting to an inner conductor of the feed line.

4. The narrow-band dipole antenna module of claim 1 further comprising an isolator element for each of the plurality of antenna openings, the isolator element having a protrusion extending from a first side thereof configured to engage one of the antenna openings, and a recess on a second side thereof for receiving one of the antenna elements of the plurality of antenna elements, the recess having an aperture therein extending to the first side of the isolator element to permit said one of the antenna elements of the plurality of antenna elements to directly engage a terminal block of the terminal blocks.

5. The narrow-band dipole antenna module of claim 4 further comprising a first sealing ring between the first side of the isolator element and the housing for forming a seal between the isolator element and the housing, and a second sealing ring between the second side of the isolator element and said one of antenna elements for forming a seal between the isolator element and said one of antenna elements of the plurality of antenna elements.

6. The narrow-band dipole antenna module of claim 1, wherein the terminal blocks are configured to hold each antenna element of the plurality of antenna elements at an angle of 45 degrees from a longitudinal axis of the hollow post.

7. The narrow-band dipole antenna module of claim 6, wherein the plurality of antenna openings comprises four antenna openings, the plurality of terminal blocks comprises four terminal blocks, and the plurality of antenna elements comprises four antenna elements.

8. The narrow-band dipole antenna module of claim 1, wherein the hollow post is configured to be adjustable in height.

9. The narrow-band dipole antenna module of claim 1, wherein the plurality of antenna elements are configured to be adjustable in length.

10. A method for assembling a narrow-band dipole antenna, the method comprising:

assembling a circuit assembly comprising an input printed circuit board having a transmit connector and a receive connector thereon for connecting to an antenna-driving circuit, a matching printed circuit board having lumped element matching components and a plurality of terminal blocks thereon, each of the terminal blocks is configured to receive an antenna element of a plurality of antenna elements, a pair of coaxial feed lines connected between the input printed circuit board and the matching printed circuit board, each of the pair of coaxial feed lines having coil formed therein such that pair of coaxial feed lines acts as a balun, and at least one rigid support member connected between the input printed circuit board and the matching printed circuit board to hold the matching printed circuit board at a fixed distance from the input printed circuit board;

inserting the circuit assembly into a housing comprising a base plate having an opening defined therein and a hollow post extending from the opening in the base plate, the hollow post having a plurality of antenna openings defined therein near a distal end thereof such that when the input printed circuit board is mounted to an underside of the base plate, the terminal blocks on matching printed circuit board are adjacent the antenna openings in the hollow post; and connecting the plurality of antenna elements to the plurality of terminal blocks.

11. The method of claim 10, wherein one of the pair of coaxial feed lines has a clockwise coil formed therein and the other of the pair of coaxial feed lines has a counterclockwise coil formed therein.

12. The method of claim 10, wherein the matching printed circuit board has a first face facing the input printed circuit board and a second face opposite the first face with the terminal blocks mounted on the second face, and comprises a pair of feed line landing pads for connecting to the pair of coaxial feed lines, each feed line landing pad comprising an annular ring on the first face of the matching printed circuit board for connecting to an outer conductor of one of the coaxial feed lines, and a plated through hole extending from within to an annular ring on the first face to the second face of the matching printed circuit board for connecting to an inner conductor of said one of the coaxial feed lines.

13. The method of claim 10, wherein connecting the plurality of antenna elements further comprises connecting an isolator element for each of the plurality of antenna openings, the isolator element having a protrusion extending from a first side thereof configured to engage one of the antenna openings, and a recess on a second side thereof for receiving one of the antenna elements of the plurality of antenna elements, the recess having an aperture therein extending to the first side of the isolator element to permit said one of the antenna elements of the plurality of antenna elements to directly engage a terminal block of the terminal blocks.

14. The method of claim 13, wherein connecting the plurality of antenna elements further comprises connecting a first sealing ring between the first side of the isolator element and the housing for forming a seal between the isolator element and the housing, and a second sealing ring between the second side of the isolator element and said one of the antenna elements of the plurality of antenna elements for forming a seal between the isolator element and said antenna element of the plurality of antenna elements.

15. The method of claim 10, wherein the terminal blocks are configured to hold the antenna elements at an angle of 45 degrees from a longitudinal axis of the hollow post.

16. The method of claim 10, wherein the plurality of antenna openings comprises four antenna openings, the plurality of terminal blocks comprises four terminal blocks, and the plurality of antenna elements comprises four antenna elements.

17. A system comprising:

a housing comprising a base plate having an opening defined therein, and a hollow post extending from the opening in the base plate, the hollow post having a plurality of antenna openings defined therein near a distal end thereof, wherein a height of the hollow post is configured to be adjusted;

a circuit assembly configured for insertion into the housing, the circuit assembly comprising:

an input printed circuit board having a transmit connector and a receive connector thereon for connecting to an antenna-driving circuit;

a matching printed circuit board having lumped element matching components and a plurality of terminal blocks thereon;

a plurality of antenna elements configured to be received through the antenna openings and connected to the terminal blocks;

wherein each of the terminal blocks is configured to receive an antenna element of the plurality of antenna elements;

a pair of coaxial feed lines connected between the input printed circuit board and the matching printed circuit board; and at least one rigid support member connected between the input printed circuit board and the matching printed circuit board to hold the matching printed circuit board at a fixed distance from the input printed circuit board such that when the input printed circuit board is mounted to an underside of the base plate, the terminal blocks on the matching printed circuit board are adjacent the antenna openings in the hollow post; and wherein lengths of the antenna elements of the plurality of antenna elements are configured to be adjusted.

18. The system of claim 17, wherein each of the pair of coaxial feed lines having a coil formed therein such that the pair of coaxial feed lines acts as a balun.

19. The system of claim 18, wherein one of the pair of coaxial feed lines has a clockwise coil formed therein and the other of the pair of coaxial feed lines has a counter-clockwise coil formed therein.

20. The system of claim 17, wherein the plurality of antenna openings comprises four antenna openings, the plurality of terminal blocks comprises four terminal blocks, and the plurality of antenna elements comprises four antenna elements.

* * * * *